United States Patent [19]
Zipplies

[11] Patent Number: 5,216,068
[45] Date of Patent: Jun. 1, 1993

[54] PROCESS FOR PRODUCING AN AGGLOMERATED MOLDING POWDER COMPOSED OF POLYTETRAFLUOROETHYLENE AND HYDROPHOBIC FILLERS

[75] Inventor: Tilman Zipplies, Kastl, Fed. Rep. of Germany

[73] Assignee: Hoechst Aktiengesellschaft, Frankfurt am Main, Fed. Rep. of Germany

[21] Appl. No.: 626,961

[22] Filed: Dec. 13, 1990

[30] Foreign Application Priority Data

Dec. 15, 1989 [DE] Fed. Rep. of Germany ....... 3941368

[51] Int. Cl.$^5$ .......................... C08J 3/16; C08L 27/18; C08K 3/04
[52] U.S. Cl. ...................... 524/546; 523/335
[58] Field of Search ................. 523/335; 524/546

[56] References Cited

U.S. PATENT DOCUMENTS

| | | |
|---|---|---|
| 3,527,857 | 9/1970 | Fitz . |
| 3,778,391 | 12/1973 | Morris et al. ............ 523/335 |
| 3,781,258 | 12/1973 | Kometani et al. . |
| 3,915,916 | 10/1975 | Leverett . |
| 3,929,721 | 12/1975 | Leverett . |
| 3,980,596 | 9/1976 | Leverett . |
| 4,370,436 | 1/1983 | Nakamura et al. . |
| 4,408,007 | 10/1983 | Kuhls et al. ............. 523/335 |
| 4,440,879 | 4/1984 | Kawachi ................ 524/545 |
| 4,451,616 | 5/1984 | Kawachi ................ 524/545 |
| 4,665,113 | 5/1987 | Eberl . |
| 4,977,241 | 12/1990 | Sugimori et al. .......... 523/335 |

FOREIGN PATENT DOCUMENTS 223308 of 1968 U.S.S.R. .

Primary Examiner—John C. Bleutge
Assistant Examiner—D. R. Wilson
Attorney, Agent, or Firm—Connolly & Hutz

[57] ABSTRACT

The properties of agglomerated molding powders of PTFE and hydrophobic fillers are improved if the agglomerates are washed after completing the agglomerating process with a liquid medium which contains a surface-active agent.

17 Claims, No Drawings

PROCESS FOR PRODUCING AN AGGLOMERATED MOLDING POWDER COMPOSED OF POLYTETRAFLUOROETHYLENE AND HYDROPHOBIC FILLERS

DESCRIPTION

The invention relates to a process for producing an agglomerated molding powder composed of agglomerates of a tetrafluoroethylene polymer not processible from the melt with at least one finely divided filler composed of a hydrophobic material, the filler being contained in the agglomerated particles in substantially uniform dispersion, by premixing a finely divided granular tetrafluoroethylene polymer powder and the filler, suspending the mixture in a liquid agglomerating medium composed of water and an organic liquid which wets the tetrafluoroethylene polymer powder and is soluble in water to an amount of not more than 15% by weight, and agglomerating while stirring.

Raw polymers of tetrafluoroethylene which are obtained by the process of suspension polymerization in an aqueous or aqueous organic phase have a low bulk density and are virtually incapable of flowing, which makes their processing in automatic installations for the pressure sintering technique extremely difficult.

It is known that the polytetrafluoroethylene (PTFE) produced by suspension polymerization is subjected to an agglomeration process in an aqueous organic medium to improve its flow behavior and increase the bulk density after the raw polymer has first been comminuted to a certain smaller but uniform particle size by grinding. It is also possible to obtain filler-containing mixtures with high flowability and increased bulk density if this process is carried out in the presence of fillers (U.S. Pat. No. 3,781,258). In this process, the filler is incorporated more or less homogeneously in the agglomerated granule. In the case of fillers having a hydrophobic surface such as, for example, carbon black or carbon powder, this process can be carried out with satisfactory results, whereas, on the other hand, in the case of fillers having a hydrophilic surface such as, for example, metal powders or metal flakes, appreciable proportions of the filler used remain in the aqueous organic agglomerating medium and are thus lost to the agglomeration process. Therefore a whole number of processes have been disclosed in which the filler is either subjected to a hydrophobizing treatment before the agglomeration or a hydrophobizing agent is present in the liquid phase during the agglomeration process. Representative examples of such additives are aminosilanes and/or silicones, aliphatic carboxylic acids or their salts with cations of group II of the periodic system, aminosilanes in combination with carboxylic acid or with anionic surface-active agents such as sodium lauryl sulfate, and furthermore also those additives which are composed of alkanesulfonate or alkyl sulfate only (as described in U.S. Pat. Nos. 3,915,916, 3,929,721, 3,980,596, 4,370,436 and 4,665,113).

If, on the other hand, the agglomeration of hydrophobic fillers does not even require such pretreatment steps or additives, the production of a completely homogeneous granule structure between PTFE and the filler right up to the outer zones of the agglomerated granule is also nevertheless a problem in this case. Specifically, it has been found that an appreciable amount of filler is deposited on the surface of the agglomerated particle and its concentration far exceeds the ratio of filler to PTFE in the interior of the particle. This produces a considerable disadvantage in an important field of application of such agglomerated PTFE/filler molding powders, namely pressure sintering processing using automatic filling of the gathering mold. An appreciable reduction in tensile strengths and elongation at break is observed in moldings which have been produced from such molding powders, which can probably be attributed to an inadequate sintering together of the PTFE particles owing to the "filler envelope" situated in between. Although it is possible to remove at least some of this excess filler by shaking and sieving, this is a cumbersome and, owing to the time expenditure and the dust formation, a troublesome working step. The object consequently existed of eliminating this defect.

This object is achieved, according to the invention, by a process of the type mentioned in the preamble which comprises treating the agglomerates formed after completing the agglomerating process in a liquid medium by means of washing-like agitation with a surface-active agent in an amount which is sufficient to effect a wetting of the hydrophobic filler material.

The process according to the invention relates to the agglomeration of tetrafluoroethylene polymers not processible from the melt. This term "not processible from the melt" is understood to mean primarily the homopolymer, namely the polytetrafluoroethylene itself, but, in addition, also the so-called "modified" tetrafluoroethylene polymers, i.e. those polymers of tetrafluoroethylene which contain a fluorinated or preferably perfluorinated commoner in an amount so small—usually $\leq 2$ mol-%, preferably $\leq 0.5$ mol-%—that the nature of the polymer as "not processible from the melt" is retained. Such comonomers are, for example, chlorotrifluoroethylene, hexafluoroisobutylene, 1-perfluorobutene, perfluoroalkyl perfluorovinyl ether containing a perfluoroalkyl radical of 1 to 5 carbon atoms, in particular perfluoropropyl perfluorovinyl ether and hexafluoropropylene. Such tetrafluoroethylene polymers have an apparent melt viscosity of at least $1 \cdot 10^8$ Pa.s at 380° C. as measured by the creep test [Ajroldi et al., J. Appl. Polym. Sci., 14 (1970), pages 79 ff]. Where the abbreviation PTFE is used in this description, it relates to all these types of tetrafluoroethylene polymers which are not processible from the melt. In the agglomeration process to form a PTFE molding powder of high bulk density and good flowability, suspension polymers of tetrafluoroethylene are used, the PTFE obtained by said process, which has a mean particle size of about 1,200 to 800 μm and higher as a raw polymer, being subjected to one of the known comminution processs for PTFE—for example, grinding in a hammer mill or wet cutting—and thus finely divided to a mean particle size of 20 to 100 μm. The fillers used should likewise be in finely divided form, i.e. have about the same mean particle size as the ground PTFE. The agglomeration process itself is known to the person skilled in the art, for example from the U.S. Pat. No. 3,527,857 and 3,781,258. In this process, the PTFE powder, premixed with the fillers, is suspended in a liquid agglomerating medium which is composed of water and an organic liquid, said organic liquid having to be capable of wetting the PTFE powder and, in addition, being allowed to be soluble in water to an amount of not more than 15% by weight, preferably not more than 3% by weight. Such organic liquids are, for example, hydrocarbons or their mixtures, for example, n-heptane, n-octane, petroleum ether fractions, in particular those having boiling points of 80° to 150° C., cyclohexane, benzene, toluene; halogenated hydrocarbons, for example perchloroethylene, chloroform, trichloroethylene, carbontetrachloride or chlorofluorohydrocarbons such as 1,1,2-trifluoro-1,2,2-trichloroethane. The ratio of water to solids, i.e. to the sum of the PTFE powder and filler, should be in the range from 3:1 to 1:3, and the ratio of solids to organic liquid in the range from 1:1 to 10:1 parts by weight. The proportion of filler in the mixture with PTFE is in the range from 5 to 50, preferably from 10 to 30% by volume, based on the volume of the mixture. The suspended mixture of PTFE and filler is then stirred for a prolonged time for the purpose of agglomerating it, and during this process the mixture can be kept at room temperature or even heated to temperatures which are below or at the boiling point of the organic liquid used; preferably a temperature of 40° to 50° C. is employed. The stirring energy, the time duration and the temperature, and also, in particular, the ratio of organic liquid to solids determine the degree of agglomeration, which can be adjusted by suitable choice of these parameters.

The completion of the agglomeration process can be detected by the fact that the agglomerates formed no longer exhibit any increase in particle diameter, which can be determined, for example, by diffraction measurements with laser beams.

The treatment of the agglomerates formed by the process according to the invention is carried out in a liquid medium to which the surface-active agent is added. In this connection, the ratio of agglomerate to liquid medium is not critical. The agglomerates to be treated can be suspended in the liquid medium, but it may also even be sufficient to spray them with a solution of the surface-active agent after separating off the liquid agglomerating medium. The treatment is carried out by means of a washing-like agitation. It should in general amount to at least 5 minutes, but there is no upward limit on this time duration.

In this connection, washing-like agitation should be understood to means any type of agitation which brings mild shearing forces between liquid medium and agglomerates into operation and brings both into intimate contact. This can be effected by stirring, circulating or mixing with mild shearing action or by shaking in a vessel or rotational movements of the vessel. The washing-like agitation may also comprise of whirling up of the agglomerates in the liquid medium containing the surface-active substance or the spraying of said agglomerates with a jet of the said liquid medium.

After this aftertreatment, the entire suspension or slurry is drained via a suitable separating device, for example a sieve, the granules remaining behind on the separating device, whereas the excess filler is removed along with the liquid treatment medium.

The surface-active agent may also be added directly after the completed agglomeration to the liquid agglomerating medium, the organic liquid either being separated off beforehand or, alternatively, said organic liquid remaining in the liquid medium. Finally, the agglomerates can be separated off from the liquid agglomerating medium by sieving, filtering off and similar separating methods and then suspended in water or a predominantly aqueous medium and treated after adding the surface-active agent. Again, the organic component of the agglomerating liquid, which is predominantly in the agglomerated granules after the agglomeration process, can be concomitantly removed during the separation, for example by heating, or remain in the granules during the treatment.

The concentration of the surface-active agent is not very critical. It must be at least high enough for the surface of the agglomerates formed to be wetted by the liquid treatment medium. The concentration will therefore be in the range from 30 to 1000 ppm, preferably 50 to 500 ppm.

Nonionic, anionic and cationic surfactants may be used as surface-active agents.

Suitable nonionic surfactants for this purpose are, in particular, the following:

Alkylphenol ethoxylates of the formula:

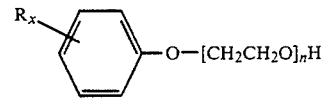

where n=4 to 20, R being an alkyl radical containing 4 to 20 carbon atoms which may be substituted in the benzene ring one to three times (x=1 to 3), and it being possible for the ethylene oxide units to be replaced in part by propylene oxide units; fatty alcohol ethoxylates of the formula:

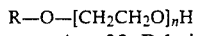

where n=4 to 20, R being an alkyl radical containing 4 to 20 carbon atoms which may also be partially fluorinated or perfluorinated, and it being possible for the ethylene oxide units to be replaced in part by propylene oxide units; and also ethylene oxide/propylene oxide block copolymers of the formula:

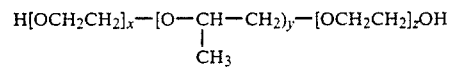

where x=2 to 20, y=10 to 50 and z=2 to 20. The nonionic condensation products of amines, in particular fatty amines, or of fatty acid esters with ethylene oxide or mixtures of ethylene oxide and propylene oxide can also be used.

Suitable nonionic surfactants are furthermore amine oxides which have the formulae $R^1R^2R-NO$, $R^1(R)_2-NO$. Here $R^1$ and $R^2$ are each a methyl or ethyl radical, and R is a longer-chain alkyl radical containing 10 to 18 carbon atoms. Amine oxides of the first-named formula are preferred.

As anionic surfactants which can be used within the scope of the process according to the invention, mention may be made of alkanesulfonates and alkyl sulfates, alkylbenzenesulfonates and alkylaryl sulfates, salts of higher fatty acids, salts of alkanephosphonic acids, alkyl or alkylaryl phosphates, alkoxylated sulfonic acids or their salts, and also sulfosuccinates or their salts. In particular, the perfluorinated or partially fluorinated derivatives of these compounds, for example salts of perfluorinated alkanoic acids or perfluorinated alkanesulfonic acids, are also suitable. All the said anionic surfactants are preferably in the form of their alkalimetal or ammonium salts.

Finally cationic surfactants such as the ammonium salts of long-chain secondary and tertiary amines can also be used in the process according to the invention as surface-active agents.

Preferably, however, nonionic or anionic surfactants are used. Mixtures of representatives of both of these groups may also be used.

Hydrophobic fillers which can be agglomerated jointly with PTFE without hydrophobizing pretreatment and then treated by the process according to the invention are carbon and graphite in their various physical material forms such as powders, fibers, flakes or granules, and furthermore carbon black, coke powder and the like. Further categories of hydrophobic fillers are heavy metal sulfides such as molybdenum sulfide or cadmium sulfide, and furthermore high-temperature-resistant synthetic resins in the form of powders, fibers or flakes, such as, for example, polyether ketones, polyether sulfones, polyarylene sulfides, polyimides or aromatic polyamides. Furthermore, combined agglomerates of certain hydrophobic organic pigments and PTFE, such as, for example, agglomerates of PTFE and phthalocyanines are accessible to treatment. All the said hydrophobic fillers have in common that they are wetted in the liquid agglomerating medium of the organic phase which is essentially immiscible with water.

The substantial advantage of the agglomerated PTFE/filler product treated by the process according to the invention is that moldings produced by the pressure sintering process have an appreciably improved tear strength and elongation at break, as the comparison experiment carried out below also shows. If peeled films are peeled off blocks which have been pressed from agglomerates filled in this way, they have an appreciably improved gas tightness. Finally, the dust formation of the agglomerated product due to the excess filler is also reduced and contamination of processing machines is avoided.

The invention is illustrated by the following examples:

EXAMPLE 1

PTFE and filler were agglomerated in a glass vessel having a diameter of 20 cm which was fitted with a three-vane propeller stirrer and filled with 4500 ml of water at 50° C. Petroleum ether with a boiling range of from 80° to 110° C. in an amount of 900 ml was used as organic liquid.

A polytetrafluoroethylene powder which was produced by suspension polymerization and which had been ground beforehand to a mean diameter of the primary particles for the agglomeration of about 20 μm was used as tetrafluoroethylene polymer. Coke powder with a mean particle size of 20 μm was used as filler in a proportion of 25% by volume, based on the volume of total solids. For the agglomeration, 2 kg of a homogeneous mixture, produced by dry mixing, of this PTFE and said filler were used.

Stirring was started at a rotary speed of 1400 min$^{-1}$ and continued for 30 min. After the petroleum ether had been removed by heating the liquid phase, a nonylphenol reacted with on average 9.5 units of ethylene oxide was then added as surface-active agent to the remaining aqueous phase in such an amount as to produce a concentration of 250 ppm. After stirring for a further 15 min (rotary speed 500 min$^{-1}$) the suspension was then separated by means of a sieve (mesh size 150 μm), the agglomerated particles remaining on the sieve surface while the water and the excess filler passed through the sieve. After washing with water, the agglomerates were dried at 280° C. and subjected to testing for tear strength and elongation at break in the standard method according to ASTM Standard 1457. The values obtained are entered in Table 1.

EXAMPLE 2

The procedure was as in Example 1, but didecyl sulfosuccinate was used as surface-active agent in a concentration of 250 ppm. The values obtained for tear strength and elongation at break are shown in Table 1.

EXAMPLES 3 TO 7

The agglomeration was carried out in accordance with Example 1, but in this case carbon powder having a mean particle diameter of 20 μm was used as filler in a proportion of 25% by volume, based on the volume of total solids. The surfactant was added after completion of the agglomeration. The vessel was kept for 15 min on a shaker. Then the petroleum ether was removed by heating while continuing to agitate and the residual suspension was separated by means of a sieve, as specified in Example 1. The nature of the wetting agent used, its concentration and the mechanical properties of the test piece obtained from the agglomerated product are listed in Table 1.

COMPARISON EXAMPLES A AND B

The agglomeration was carried out in accordance with Example 1. After completion of the stirring and separation of the petroleum ether by heating the liquid phase, the agglomerated product was separated off by means of a sieve without further treatment and dried at 280° C. In Comparison Example A coke powder was used as in Examples 1 and 2, while carbon powder was used in Comparison Example B as in Examples 3 to 7, in each case in a proportion of 25% by volume, based on the volume of total solids. The values obtained are listed in Table 1.

TABLE 1

| Examples Comparison examples | Filler | Surface-active substance | Concentration [ppm] | Tear strength [N/mm$^2$] | Elongation at break [%] |
|---|---|---|---|---|---|
| 1 | Coke | A | 250 | 20.3 | 120 |
| 2 | Coke | B | 250 | 20.4 | 120 |
| A | Coke | — | — | 13.5 | 30 |
| 3 | Carbon | A | 250 | 17.5 | 145 |
| 4 | Carbon | B | 250 | 17.4 | 115 |
| 5 | Carbon | C | 500 | 18.8 | 165 |
| 6 | Carbon | A | 500 | 16.5 | 135 |
| B | Carbon | — | — | 10.7 | 85 |

A = Ethoxylated nonylphenol (containing 9.5 ethylene oxide units)
B = Didecyl sulfosuccinate
C = Sodium lauryl sulfate

I claim:

1. A process for producing an agglomerated molding powder comprising agglomerates of a tetrafluoroethylene polymer not processable from the melt and at least one finely divided filler comprising a hydrophobic material, the filler being contained in the agglomerated particles, said process comprising the steps of:
   (a) premixing a finely divided granular tetrafluoro ethylene polymer powder not processable from the melt and a filler comprising a hydrophobic material,
   (b) suspending the mixture resulting from step (a) in a liquid agglomeration medium, (c) agglomerating the mixture suspended in the liquid agglomeration medium according to step (b) while stirring, thereby forming agglomerates, (d) after the essential completion of said step (c), treating said agglomerates by means of agitation with mild shearing forces and with a surface-active agent in an amount which is sufficient to effect a wetting of the hydrophobic material, thereby improving the uniformity of dispersion of filler material in the agglomerates.

2. The process as claimed in claim 1, wherein, in said step (d), said agitation brings shearing forces between the liquid agglomeration medium and the agglomerates and brings both the liquid agglomeration medium and the agglomeration into intimate contact.

3. The process as claimed in claim 1, wherein the liquid agglomeration medium comprises water and an organic liquid which wets the tetrafluoroethylene polymer and is soluble in water to an amount of not more than 15% by weight.

4. The process as claimed in claim 3, wherein the organic liquid is substantially removed from the said medium after the completion of said step (c), and the surface-active agent is added to the remaining aqueous phase for said step (d).

5. The process as claimed in claim 1, wherein the surface-active agent is an anionic surfactant.

6. The process as claimed in claim 1, wherein the surface-active agent is an anionic surfactant.

7. The process as claimed in claim 1, wherein the amount of surface-active agent added is 30 to 1000 ppm based upon the aqueous phase.

8. A process for improving the uniformity of dispersion of finely divided filler material in agglomerates comprising a granular tetrafluoroethylene polymer not processible from the melt and at least one finely divided filler comprising a hydrophobic material, the filler being contained in the agglomerates, the agglomerates having been obtained by premixing the tetrafluoroethylene polymer and the filler, suspending the resulting mixture in a liquid agglomeration medium to obtain a suspension, and stirring the resulting suspension to obtain the agglomerates, which process comprises:

after-treating the thus-formed agglomerates in a liquid after-treating medium by agitating the agglomerates with a surface active agent in an amount which is sufficient to effect a wetting of the hydrophobic material, and recovering agglomerates of improved uniformity of composition from the liquid after-treating medium.

9. The process as claimed in claim 8, wherein the agitating of agglomerates with a surface-active agent brings shearing forces between the liquid agglomeration medium and the agglomerates and brings both the liquid agglomeration medium and the agglomerates into intimate contact.

10. The process as claimed in claim 8, wherein the liquid agglomeration medium comprises water and an organic liquid which wets the tetrafluoroethylene polymer and is soluble in water to an amount of not more than 15% by weight.

11. The process as claimed in claim 8, wherein the surface-active agent is a nonionic surfactant.

12. The process as claimed in claim 8, wherein the surface-active agent is an anionic surfactant.

13. The process as claimed in claim 8, wherein the amount of surface-active agent added is 30 to 1000 ppm based upon the aqueous phase.

14. A process for producing an agglomerated molding powder comprising agglomerates of a tetrafluoroethylene polymer not processible from the melt and at least one uniformly dispersed finely divided filler comprising a hydrophobic material, the filler being contained in the agglomerated particles, said process comprising the steps of:

(a) premixing a finely divided granular tetrafluoroethylene polymer powder not processible from the melt and a filler comprising a hydrophobic material, (b) suspending the mixture resulting from step (a) in a liquid agglomeration medium, (c) agglomerating the mixture suspended in the liquid agglomeration medium according to step (b) while stirring, thereby forming agglomerates, (d) after the essential completion of said step (c), treating said agglomerates by means of agitation with a surface-active agent, in a liquid treatment medium, in an amount which is sufficient to effect a wetting of the hydrophobic material, thereby improving the uniformity of dispersion of filler material in the agglomerates, and (e) recovering agglomerates of improved uniformity of composition from the liquid treatment medium.

15. The process as claimed in claim 1, wherein, before beginning said step (d), the liquid agglomeration medium is separated off from the agglomerates formed in said step (c).

16. The process as claimed in claim 8, wherein said thus-formed agglomerates are separated off from the liquid agglomeration medium before said after-treating step is begun.

17. The process as claimed in claim 14, wherein, before beginning said step (d), the liquid agglomeration medium is separated off from the agglomerates formed in said step (c).

* * * * *

UNITED STATES PATENT AND TRADEMARK OFFICE
CERTIFICATE OF CORRECTION

PATENT NO. : 5,216,068
DATED : June 1, 1993
INVENTOR(S) : Tilman Zipplies

It is certified that error appears in the above-indentified patent and that said Letters Patent is hereby corrected as shown below:

At column 2, line 33, "commoner" should read --comonomer--.

At column 2, line 53, "process" should read --processes--.

At column 3, line 43, "means" should read --mean--.

In claim 5, at column 7, line 26, "an anionic" should read --a nonionic--.

Signed and Sealed this

Twenty-second Day of March, 1994

Attest:

BRUCE LEHMAN

*Attesting Officer*     *Commissioner of Patents and Trademarks*